United States Patent
Kubusch et al.

(10) Patent No.: US 7,252,166 B2
(45) Date of Patent: *Aug. 7, 2007

(54) INDUSTRIAL TRUCK WITH AN ELECTRICAL DRIVE AND A FUEL CELL SYSTEM AND METHOD FOR THE OPERATION OF AN INDUSTRIAL TRUCK

(75) Inventors: Dietmar Kubusch, Buchholz (DE); Torsten Leifert, Vögelsen (DE)

(73) Assignee: Still GmbH, Hamburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/887,241

(22) Filed: Jul. 7, 2004

(65) Prior Publication Data

US 2005/0045391 A1    Mar. 3, 2005

(30) Foreign Application Priority Data

Jul. 8, 2003    (DE)    ............................... 103 30 815

(51) Int. Cl.
*B60K 1/00* (2006.01)

(52) U.S. Cl. .................................. 180/65.3; 180/65.1

(58) Field of Classification Search ............... 180/65.3, 180/65.1, 65.2, 68.5, 65.5; 903/908, 951; 429/12, 13

See application file for complete search history.

(56) References Cited

U.S. PATENT DOCUMENTS

| | | | |
|---|---|---|---|
| 5,248,566 A * | 9/1993 | Kumar et al. .................. 429/19 |
| 6,378,637 B1 * | 4/2002 | Ono et al. .................. 180/65.3 |
| 6,571,542 B1 * | 6/2003 | Fillman et al. ............... 56/10.6 |
| 6,722,460 B2 * | 4/2004 | Yang et al. .................. 180/220 |
| 6,799,562 B2 * | 10/2004 | Pratt et al. .................... 123/514 |
| 6,874,588 B2 * | 4/2005 | Kato et al. .................. 180/65.3 |
| 6,886,582 B2 * | 5/2005 | Choi ........................... 137/264 |
| 6,905,791 B2 * | 6/2005 | Busenbender ................. 429/13 |
| 6,923,281 B2 * | 8/2005 | Chernoff et al. ........... 180/65.2 |
| 2004/0129466 A1 * | 7/2004 | Leifert ....................... 180/65.2 |
| 2005/0029022 A1 * | 2/2005 | Kubusch et al. ........... 180/65.3 |
| 2006/0086342 A1 * | 4/2006 | Studebaker et al. ........ 123/514 |

FOREIGN PATENT DOCUMENTS

GB    2401591 A    * 11/2004

* cited by examiner

Primary Examiner—J. Allen Shriver
(74) Attorney, Agent, or Firm—The Webb Law Firm

(57) ABSTRACT

An industrial truck (1) is provided that includes an electrical drive and a fuel cell system (8). A method for the operation of an industrial truck (1) with an electrical drive and a fuel cell system (8) is also provided. On the industrial truck (1) with an electrical drive and a fuel cell system (8) there can be at least one easily replaceable fuel reservoir (11). The method teaches that at least one easily replaceable fuel reservoir (11) can be kept on hand at the operating location of the industrial truck (1).

16 Claims, 1 Drawing Sheet

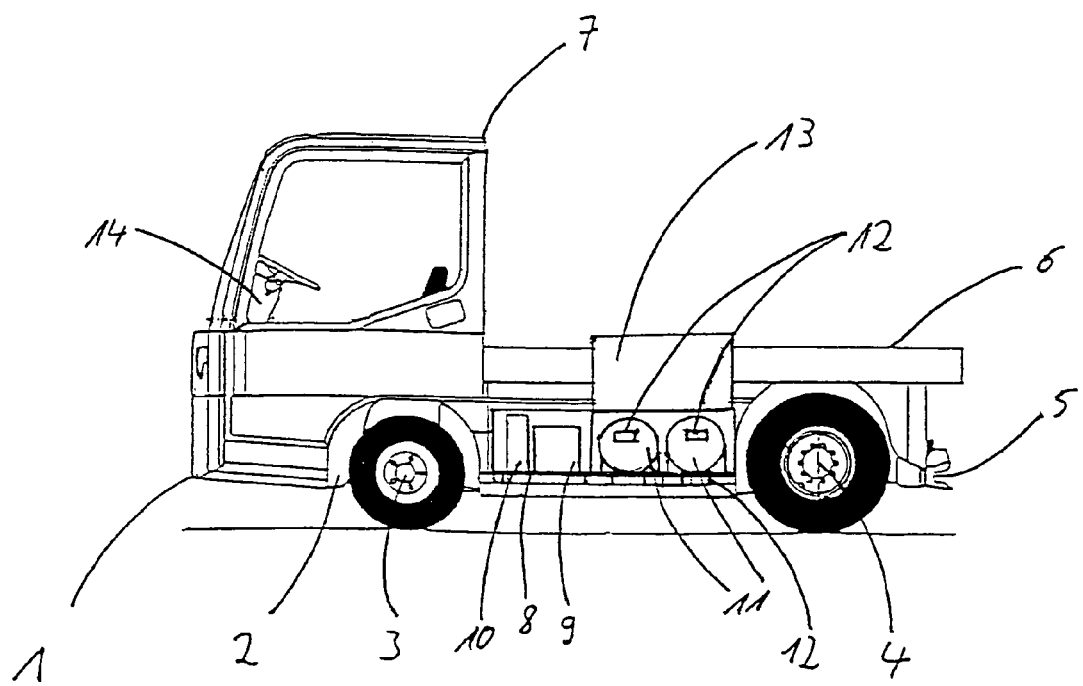

US 7,252,166 B2

INDUSTRIAL TRUCK WITH AN ELECTRICAL DRIVE AND A FUEL CELL SYSTEM AND METHOD FOR THE OPERATION OF AN INDUSTRIAL TRUCK

CROSS REFERENCE TO RELATED APPLICATION

This application claims priority to German Application No. 103 30 815.6 filed Jul. 8, 2003.

BACKGROUND OF THE INVENTION

1. Field of the Invention

This invention relates to an industrial truck with an electrical drive and a fuel cell system. The invention also relates to a method for the operation of an industrial truck with an electrical drive and a fuel cell system.

2. Technical Considerations

Industrial trucks are used for the internal transport of goods. That frequently means that industrial trucks must be used in enclosed buildings where emissions-free operation must be guaranteed. On industrial trucks that are primarily used indoors, electrical drives are most often used to achieve emissions-free operation. Batteries are most often used as the energy supply for the electrical drive system because they represent a reliable technology that is readily available. Fuel cells are being used with increasing frequency, however, in particular on account of their high efficiency. These fuel cells are generally operated with hydrogen, although the storage of hydrogen, both in fuel depots and on board vehicles, requires complex and expensive storage systems. Among other things, the refueling process for the fuel reservoirs of fuel cell vehicles is complex and expensive in terms of both the time required and the equipment that must be made available to produce or store hydrogen. With this system, the distributed supply of hydrogen fuel to a fleet of industrial trucks becomes particularly complicated and expensive, while a central refueling station, in particular in large plants, requires unnecessarily long travel distances and, thus, an additional reduction in efficiency in the operation of the trucks.

Therefore, it is an object of the invention to provide an industrial truck with an electrical drive and a fuel cell system in which the fuel supply can be replenished quickly and easily. It is also an object of the invention to provide a method for the operation of an industrial truck with an electrical drive and a fuel cell system in which the fuel supply can be replenished quickly and easily.

SUMMARY OF THE INVENTION

The invention teaches that at least one easily replaceable fuel reservoir can be provided for the industrial truck. Instead of refilling the empty fuel reservoir, the empty reservoir can simply be replaced with a full one. Replacing the fuel reservoir is easier and faster than refilling it.

It is particularly advantageous if at least two fuel reservoirs are provided which can be used simultaneously to supply the fuel cell system with fuel. It is thereby possible to activate an additional reservoir when a great deal of power is required, so that the connecting lines of the reservoirs can each be designed smaller than if the reservoirs were going to be used individually to meet the maximum performance requirements.

It is, likewise, advantageous if at least two fuel reservoirs are provided which can be used alternately for the fuel supply of the fuel cell system. In this manner, as soon as a reservoir is empty or near empty, a full reservoir can be activated, for example to allow the industrial truck to travel to a location in which the empty reservoir can be replaced with a full one. It is also possible to use reservoirs that contain different fuels.

It is advantageous if at least one of the fuel reservoirs to be used for the fuel supply of the fuel cell system can be selected by the operator. The operator can thereby select the reservoir that contains the fuel that appears to be best suited to the current operating requirements.

In one particularly advantageous configuration, at least one of the fuel reservoirs to be used for the fuel supply of the fuel cell system can be selected automatically, e.g., without any action by the operator. The selection can be made automatically on the basis of the operating conditions, so that the operator can concentrate on driving and operating the industrial truck.

It is appropriate if the selection of the at least one fuel reservoir to be used for the fuel supply of the fuel cell system can be made as a function of the level of fuel in at least one fuel reservoir. It is thereby possible to deactivate an empty reservoir and activate a full reservoir to supply fuel to the fuel cell system.

In one advantageous realization of the invention, the selection of the at least one fuel reservoir to be used for the fuel supply of the fuel cell system can be made as a function of the fuel requirements of the fuel cell system. A high fuel requirement can thereby be met by activating a plurality of fuel reservoirs.

It is advantageous if the fuel cell system can be operated with different fuels. It is thereby possible to use fuel reservoirs with different fuels and thereby utilize the advantages of different fuels in different operating conditions.

In one non-limiting embodiment, hydrogen can be used as the fuel. Fuel cells that are operated with hydrogen have found widespread acceptance and can be operated without harmful emissions.

With regard to the method, the invention teaches that at least one easily replaceable fuel reservoir can be kept at the location where the industrial truck is used. When a fuel reservoir on the industrial truck is empty, it can easily be replaced with the full reservoir that is being kept on hand. It takes significantly less time to replace the fuel reservoir than to refill it. The length of time the vehicle is out of operation is, therefore, significantly shorter.

It is advantageous to operate a fleet of industrial trucks utilizing the teachings of the invention. In this case, a fleet of industrial trucks is defined as a number of industrial trucks that are operated primarily in the same operating area or are otherwise organizationally linked in terms of their operation. If a number of such vehicles are operated, the number of fuel reservoirs that must be kept on hand per vehicle in the fleet can be less than the number of reservoirs kept on hand for a single vehicle. As a result of which, the operating costs per vehicle will be lower. That is, when several vehicles can share reservoirs, less reservoirs in relation to the total number of vehicles have to be kept on hand than for a single vehicle. For example, if two reservoirs are normally allotted for a single vehicle to keep the vehicle in constant operation, it is not necessary to have ten reservoirs for five vehicles in a fleet since it is unlikely that all five vehicles in the fleet will have to exchange their reservoirs at the same time. Therefore, less than ten reservoirs could be provided. Because it is easy to replace the fuel reservoirs, no refueling devices are necessary. The fuel reservoirs can simply be distributed and stored locally so that the vehicles are not required to travel long distances to refueling stations.

It is further advantageous if identical fuel reservoirs can be stored locally for the different vehicles in a fleet of industrial trucks, in particular when the trucks are different models. As a result, the fuel reservoirs can be replaced without restrictions among the vehicles in a fleet, which simplifies the storage and management of the fuel reservoirs. If the fleet also includes vehicles with internal combustion engines that are capable of using the fuels stored in the fuel reservoirs, these trucks can also be operated with fuel from the replaceable fuel reservoirs, which further simplifies the fuel supply.

BRIEF DESCRIPTION OF THE DRAWING

Additional advantages and details of the invention are explained in greater detail below with reference to the exemplary embodiment that is illustrated in the accompanying schematic drawing, which shows an industrial truck incorporating features of the invention.

DESCRIPTION OF THE PREFERRED EMBODIMENTS

An industrial tow truck 1 of the invention includes a frame 2 that supports the major elements of the vehicle 1. These major elements can include the steerable front axle 3, the rear axle 4 with electrical traction drive motors (not shown), a trailer hitch device 5, a load carrying platform 6, and a conventional device (also not shown) to control the electrical functions, such as the functions of the traction drive motors, for example. The operator sits in a driver's cab 7 and from there controls the vehicle 1. Trailers to transport loads can be connected to the trailer hitch 5 and can thereby be towed by the vehicle 1. In the space between the axles 3, 4 underneath the load carrying platform 6, a fuel cell system 8 can be attached. The fuel cell system 8 can include a fuel cell unit 9 and a conventional electronic control system 10. Two or more fuel containers 11 can be located adjacent, e.g., behind, the fuel cell system 8. For the control and monitoring functions of the fuel cell system 8 which are operated by the operator in the driver's cab 7, there can be corresponding conventional connections and lines that are not shown here.

The individual components of the fuel cell system 8 and the fuel containers 11 can be realized for the respective fuel in a manner described by the known art. For example, when the truck is operated with hydrogen, the fuel reservoir 11 can be realized in the form of a low-temperature pressurized tank or in the form of a metal hydride storage device. When the fuel cell system is operated with fuel that is liquid at room temperature, such as methanol, for example, the fuel container 11 can be realized in a relatively simple manner. In this case, when conventional fuel cells are used, a reformer is necessary to decompose the fuel into molecules that can be used in the fuel cell, and additional space is required for that operation. However, the amount of space available for installation on relatively compact industrial tow trucks is limited. As a result of the use of direct fuel cells, in which the reformer is not needed to decompose the fuel, compact dimensions can also be achieved when methanol is used as the fuel.

If one of the fuel reservoirs 11 is empty or near empty, it can either be refilled by means of a refueling device 12 or replaced. In the illustrated exemplary embodiment, the replacement is performed from the side using a special device or a fork-lift truck or a lift truck with a special load holding device. The connections (not shown here) between the fuel reservoir 11 and the vehicle 1, such as, for example, the fuel line and electrical lines for the monitoring and control of the fuel reservoir 11, can be configured in any conventional manner so that they are easy to disconnect and to reconnect. For safety reasons, there can be an automatic cutoff when the ability to extract fuel from the reservoir is lost. This cutoff can be triggered, for example, by the opening of a cover hood 13 or by the opening of fixtures that are not shown here. The fuel reservoir 11 can be refueled directly at an exchange station if the appropriate equipment is present. Because the refueling process takes less time than the operating time of the industrial truck 1, when there are two fuel reservoirs 11, practically the only interruption in the operation is for the replacement of the fuel reservoir 11. This method is even more advantageous when a fleet of industrial trucks is operated. In this case, fewer than two fuel reservoirs per industrial truck can be required, as a result of which the costs per vehicle are significantly lower than with a single vehicle.

The method of the invention is also particularly advantageous, however, if the refueling station for the empty fuel reservoirs is not located at the point of use of the industrial truck. Because the fuel reservoirs are easy to transport, store, and exchange, they can be stored in almost any location and the exchange can thus be made directly at the location where the industrial truck is being used, while the refueling station can be located a significant distance away. For example, the refueling can be performed in specialized facilities that have appropriately large and efficient equipment, and can also perform maintenance on the fuel reservoirs and thus relieve the operator of the industrial truck of these tasks. This method is particularly effective if the vehicles in a fleet, although they can be of very different types, such as, for example, industrial tow trucks, fork-lift trucks and lift trucks, can be operated with identical fuel reservoirs. The identical features of the fuel reservoirs are primarily the connections for the fuel and the lines for the control and monitoring of the fuel reservoir and the mechanical mountings, while the variables that are not relevant for the operation of the industrial trucks, such as the internal construction, the fuel used or the capacity of the reservoirs, can all be varied. On account of the interchangeability of the reservoirs, they can be used flexibly in the various trucks of a fleet. The complexity, effort, and expense involved in storage is thereby reduced significantly. Maintenance is also significantly easier than when a large number of different types of reservoirs are used.

The attachment of the fuel reservoir 11 is naturally dependent on the construction of the industrial truck 1 and can consequently be realized on other types of industrial trucks in a manner other than the attachment illustrated in the exemplary embodiment.

In the illustrated exemplary embodiment, the tow truck 1 has two replaceable fuel reservoirs 1. However, realizations are also conceivable in which, in addition to the at least one replaceable fuel reservoir 11, one or more fuel reservoirs are installed permanently in the vehicle. This arrangement can be advantageous if there is a refueling capability in the location where the industrial truck 1 is used and if the operation of the industrial truck 1 allows sufficiently long breaks in operation for the refueling of these reservoirs. The detachable connections of the lines can thereby be eliminated, which reduces the cost and complexity of the design and manufacture of the vehicle 1. A permanently installed reservoir can also be used as a spare reservoir, for example, to make it possible for the industrial truck 1 to return to a replacement station and can, therefore, be correspondingly small. In particular when there is a spare reservoir, it is also conceivable to refuel the vehicle by means of the replaceable main reservoir 11.

In the illustrated exemplary embodiment, the fuel is taken first from one of the two reservoirs 11. If this reservoir is empty or near empty, the vehicle automatically switches over to the full reservoir 11. This switchover can be accomplished by the electronic control system 10 without any intervention on the part of the operator. The selected reservoir 11 can be displayed in the driver's cab 14. There can also be level indicators or displays for empty reservoirs 11, so that the operator knows which of the reservoirs 11 needs to be replaced or refueled. Embodiments are also conceivable in which the operator manually switches over the fuel supply or selects the active fuel reservoir(s) 11.

In a realization with a plurality of reservoirs 11, it is also possible to refuel the reservoirs 11 with different fuels. For example, there can be one methanol reservoir and one hydrogen reservoir. Hydrogen is particularly well suited for long-term operation of the truck indoors because it does not generate any harmful emissions. If the vehicle 1 is also used outdoors, it can be expected to have to travel longer distances, which means that it will have to be refueled more frequently. When methanol, which is liquid at room temperature, is used, this system requires less complex and expensive equipment, for example in terms of the reservoir containers 11 and connecting lines, and the refueling is quicker and easier than when hydrogen fuel is used. Therefore, for example, the methanol reservoir can be permanently mounted and only the hydrogen reservoir can be replaceable. The switchover from one reservoir to the other can also be done either by the operator or automatically, for example, when the truck drives through the door or gate of the building.

In an additional realization, the industrial truck 1 is normally operated from one of the two fuel reservoirs 11.

Under particularly severe load requirements and, therefore, when the demand for fuel is high, the second fuel reservoir 11 can also be activated, so that a larger quantity of fuel is available. The second fuel reservoir 11 can also be actuated either by the operator or automatically.

In an additional realization, the industrial truck 1 can be operated from both fuel reservoirs 11 in normal operation. This is the simplest construction when two fuel reservoirs 11 are used.

When the control elements, supply lines, and control devices are realized appropriately, the selection of which of the above-mentioned possibilities is used to activate the fuel reservoirs 11 depends only on the programming of the electronic control system 10. It is thereby possible, depending on the operating conditions or the equipment on the industrial truck 1, to switch among these possibilities and to adapt the configuration to meet current requirements.

When more than two fuel reservoirs 11 are used, the same operating capabilities are available regarding the selection of the active reservoir 11, i.e., for example the simultaneous operation of all the reservoirs 11 or only one reservoir 11 or an arbitrary number of reservoirs 11.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. An industrial truck, comprising:
   an electrical drive;
   a fuel cell system comprising a fuel cell unit; and
   at least two replaceable fuel reservoirs,
   wherein the fuel reservoirs are replaceable from the truck independent of the fuel cell unit and can be used to supply the fuel cell system with fuel, and wherein at least one fuel reservoir contains one type of fuel and another fuel reservoir contains a different fuel so that the industrial truck can be used either indoors or outdoors.

2. The industrial truck as claimed in claim 1, wherein the at least two fuel reservoirs can be used simultaneously to supply the fuel cell system with fuel.

3. The industrial truck as claimed in claim 1, wherein the at least two fuel reservoirs can be used alternately to supply the fuel cell system with fuel.

4. The industrial truck as claimed in claim 2, wherein the at least two fuel reservoirs to be used to supply the fuel cell system with fuel can be selected by the operator.

5. The industrial truck as claimed in claim 3, wherein of the at least two fuel reservoirs to be used to supply the fuel cell system with fuel can be selected by the operator.

6. The industrial truck as claimed in claim 2, wherein of the at least two fuel reservoirs to be used to supply the fuel cell system with fuel can be selected automatically.

7. The industrial truck as claimed in claim 3, wherein of the at least two fuel reservoirs to be used to supply the fuel cell system with fuel can be selected automatically.

8. The industrial truck as claimed in claim 6, wherein the selection of the at least one fuel reservoir to be used to supply the fuel cell system with fuel can be made as a function of the level of the fuel in at least one fuel reservoir.

9. The industrial truck as claimed in claim 7, wherein the selection of the at least one fuel reservoir to be used to supply the fuel cell system with fuel can be made as a function of the level of the fuel in at least one fuel reservoir.

10. The industrial truck as claimed in claim 6, wherein the selection of the at least one fuel reservoir to be used to supply the fuel cell system with fuel can be made as a function of the fuel demands of the fuel cell system.

11. The industrial truck as claimed in claim 7, wherein the selection of the at least one fuel reservoir to be used to supply the fuel cell system with fuel can be made as a function of the fuel demands of the fuel cell system.

12. The industrial truck as claimed in claim 1, wherein hydrogen is used as the fuel for at least one fuel reservoir and methane is used as the other type of fuel for another fuel reservoir.

13. A method for the operation of at least one industrial truck having an electrical drive and a fuel cell system, the method comprising:

providing the fuel cell system comprising a fuel cell unit and at least two replaceable fuel reservoirs, wherein the fuel reservoirs are replaceable independently of the fuel cell unit and at least one fuel reservoir contains one type of fuel and another fuel reservoir contains a different fuel so that the industrial truck can be operated either indoors or outdoors; and keeping at least one additional fuel reservoir on hand at an operating location of the industrial truck.

14. The method as claimed in claim 13, including operating a fleet of industrial trucks.

15. The method as claimed in claim 13, in which identical fuel reservoirs are kept on hand for different vehicles of a fleet of industrial trucks.

16. The method as claimed in claim 15, wherein the fleet includes different models of industrial trucks.

* * * * *